US007317966B2

(12) United States Patent
Takeda et al.

(10) Patent No.: US 7,317,966 B2
(45) Date of Patent: Jan. 8, 2008

(54) TABLET FEEDER

(75) Inventors: Nakaji Takeda, Osaka (JP); Hirokazu Amano, Osaka (JP); Noriyuki Hboshi, Osaka (JP); Yuji Takenaka, Osaka (JP)

(73) Assignee: Yuyama Mfg. Co., Ltd., Osaka (JP)

( * ) Notice: Subject to any disclaimer, the term of this patent is extended or adjusted under 35 U.S.C. 154(b) by 297 days.

(21) Appl. No.: 10/500,965

(22) PCT Filed: Jan. 8, 2003

(86) PCT No.: PCT/JP03/00051

§ 371 (c)(1),
(2), (4) Date: Apr. 4, 2005

(87) PCT Pub. No.: WO03/059743

PCT Pub. Date: Jul. 24, 2003

(65) Prior Publication Data

US 2005/0182512 A1 Aug. 18, 2005

(30) Foreign Application Priority Data

Jan. 11, 2002 (JP) ............................ 2002-004908

(51) Int. Cl.
*G06F 17/00* (2006.01)

(52) U.S. Cl. ...................... 700/236; 700/242; 700/244; 221/129; 221/130; 221/131; 221/197

(58) Field of Classification Search ................ 700/236, 700/242, 244; 221/129, 130, 131, 197
See application file for complete search history.

(56) References Cited

U.S. PATENT DOCUMENTS 5,671,592 A 9/1997 Yuyama et al.
5,709,063 A * 1/1998 Yuyama et al. ............... 53/154
5,852,911 A * 12/1998 Yuyama et al. ............... 221/17
6,012,602 A * 1/2000 Yuyama et al. ............. 221/130
6,349,848 B1 * 2/2002 Uema et al. .................... 221/6
6,471,090 B1 10/2002 Inamura et al.
6,644,504 B2 * 11/2003 Yuyama et al. ............. 221/265

(Continued)

FOREIGN PATENT DOCUMENTS

EP 0 760 234 3/1997

(Continued)

*Primary Examiner*—Gene O. Crawford
*Assistant Examiner*—Timothy Waggoner
(74) *Attorney, Agent, or Firm*—Wenderoth, Lind & Ponack, L.L.P.

(57) ABSTRACT

Tablets are delivered from a tablet storage case (3) mounted on a case support table (4), and when the tablets are passed through a delivery passage (9), formed in the case support table (3), quantity of the passed tablets is counted by a counting means (10). A start state of mounting of the tablet storage case (4) on the case support table (3) is detected by case detection means (8, 19), and the counting sensor (10) is kept in off state until the start state of mounting of the photon-electron conversion region is detected by the case detection (8, 19) and is set to On state after the detection. This ensures prevention of erroneous operation due to the mounting and dismounting of the tablet storage case (4) on and from the case support table (3).

10 Claims, 5 Drawing Sheets

U.S. PATENT DOCUMENTS

2002/0134790 A1 9/2002 Tamaoki

FOREIGN PATENT DOCUMENTS

| | | |
|---|---|---|
| JP | 50-112196 | 9/1975 |
| JP | 62-183087 | 8/1987 |
| JP | 8-91301 | 4/1996 |
| JP | 8-119201 | 5/1996 |
| JP | 8-119202 | 5/1996 |

* cited by examiner

TABLET FEEDER

TECHNICAL FIELD

The present invention relates to a tablet feeder.

BACKGROUND ART

Conventionally, there is a tablet feeder composed of a case support table on which a motor is placed, and a tablet storage case which can be mounted on or dismounted from the case support table. In this kind of the table feeder, when the motor is driven, a rotor disposed inside the tablet storage case is rotated via a plurality of gears so that tablets contained in its pocket can be discharged through a delivery passage.

In this tablet feeder, the tablets discharged from the tablet storage case are counted by a counting sensor provided on the delivery passage. There are a type of the counting sensor which maintains on state regardless of the mounting of the tablet storage case on the case support table, and a type of the counting sensor which is switched to on state only when the tablet storage case is mounted.

However, the counting sensor which constantly maintains on state may suffer erroneous operation due to external perturbations such as light from a fluorescent lamp while the tablet storage case is detached from the case support table. Also, the counting sensor which is switched to on state only when the tablet storage case is mounted on the case support table may suffer errors in the delivery quantity if tablets are accidentally dropped off before the mounting on the tablet storage case is completed and so these tablets are not detectable.

DISCLOSURE OF INVENTION

Accordingly, it is a primary object of the present invention to provide a tablet feeder capable of surely preventing erroneous operation from occurring due to the mounting and dismounting of the tablet storage case on and from the case support table.

In the present invention, as a means to solve the above problem, there is provided a tablet feeder in which tablets are delivered from a tablet storage case mounted on a case support table, and when the tablets are passed through a delivery passage formed in the case support table, quantity of the passed tablets is counted by a counting means, comprising:

case detection means for outputting a detection signal from start of mounting of the tablet storage case on the case support table, so that the counting means is kept in off state until a start state of mounting of the tablet storage case is detected by the case detection means and is set to on state after detection.

With this constitution, in the state of the tablet storage case being demounted from the case support table, the counting means can be kept in off state, which makes it possible to restrain unnecessary power consumption and also ensures prevention of the erroneous operation by the counting means due to external perturbations. Further, when the tablet storage case is mounted on the case support table, the counting means is set to on state immediately after the start of mounting. Therefore, even if tablets are accidentally dropped off from the tablet storage case, it becomes possible to reliably count the tablets by the counting means when the tablets are passed through the delivery passage, thereby preventing errors in the delivery quantity from occurring.

The tablet storage case may be provided with an information display section for displaying information about tablets to be stored, and the case support table may be provided with identification means for detecting the information display section, so that the identification means is kept in off state until a start state of mounting of the tablet storage case is detected by the case detection means and is set to on state after detection.

With this constitution, a placement position of the identification means can be determined with disregard to potential adverse influences of external perturbations.

The counting means should preferably be set to on state based on the detection signal from the case detection means after passing of noise influence time, which allows further prevention of detection errors by the counting means. Further, the case detection means may be capable of separately detecting a state from a start of mounting of the tablet storage case on the case support table to a middle of the mounting and a state from the middle of the mounting to an end of the mounting.

BEST MODE FOR CARRYING OUT THE INVENTION

Embodiments of the invention will now be described with reference to the accompanying drawings.

Figure 1:
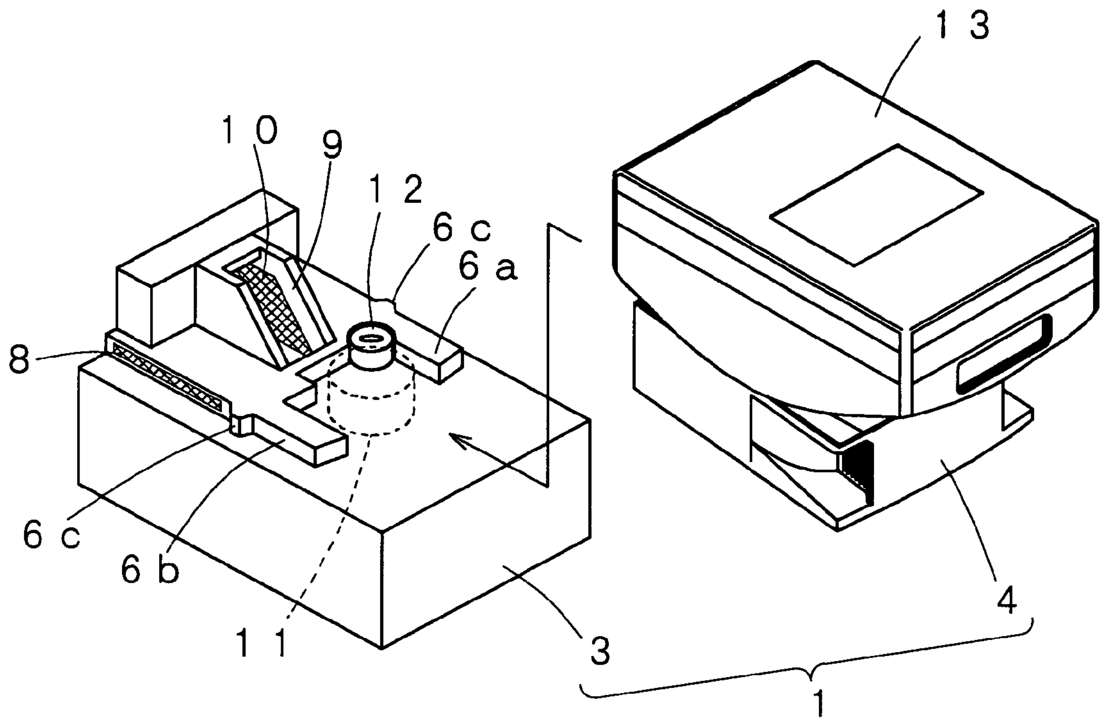
FIG. 1 is an exploded perspective view showing a tablet feeder according to the present embodiment.
Figure 5:
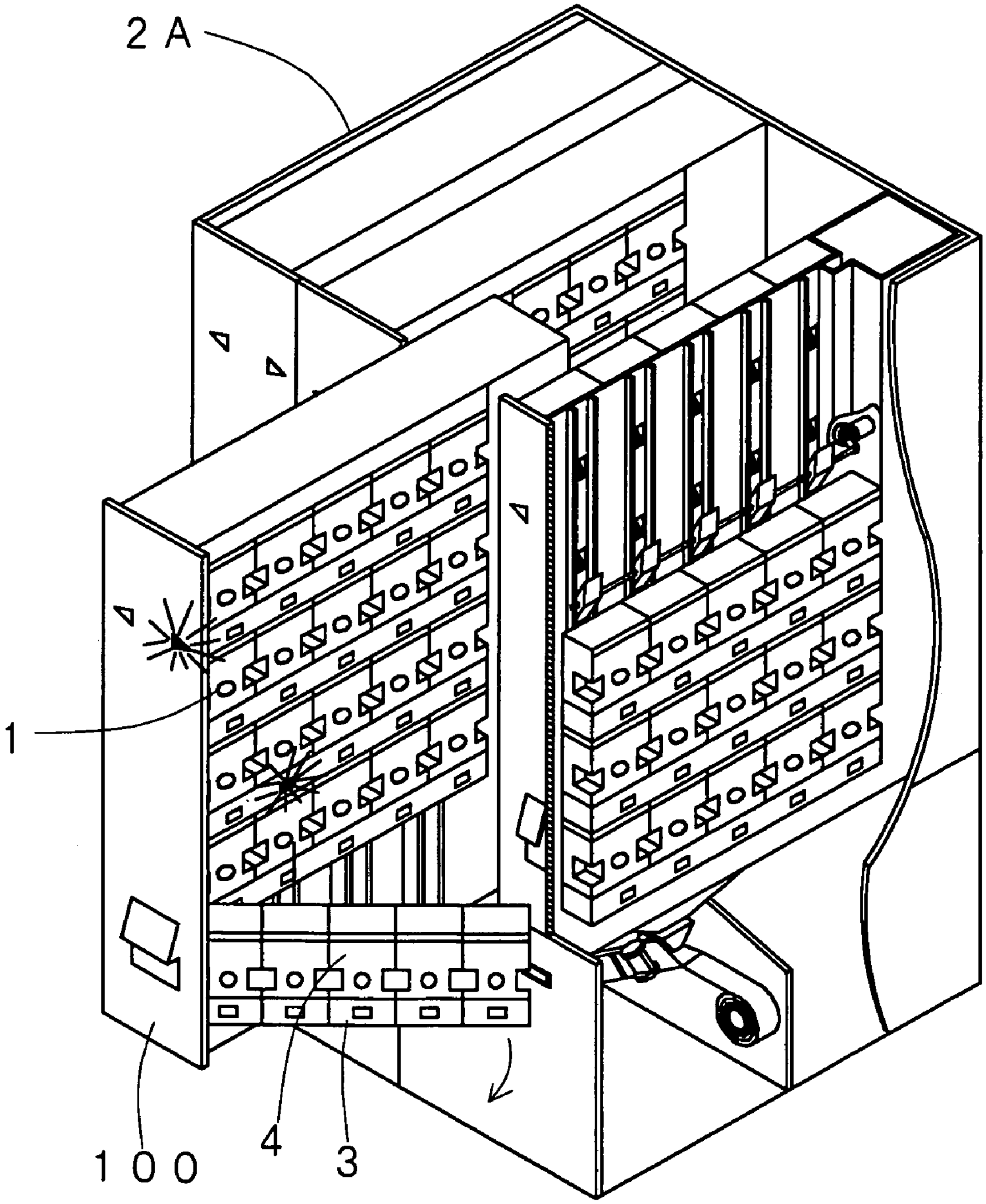
FIG. 5 is a perspective view showing a tablet feeding apparatus on which the tablet feeder shown in FIG. 1 is installed.
Figure 6:
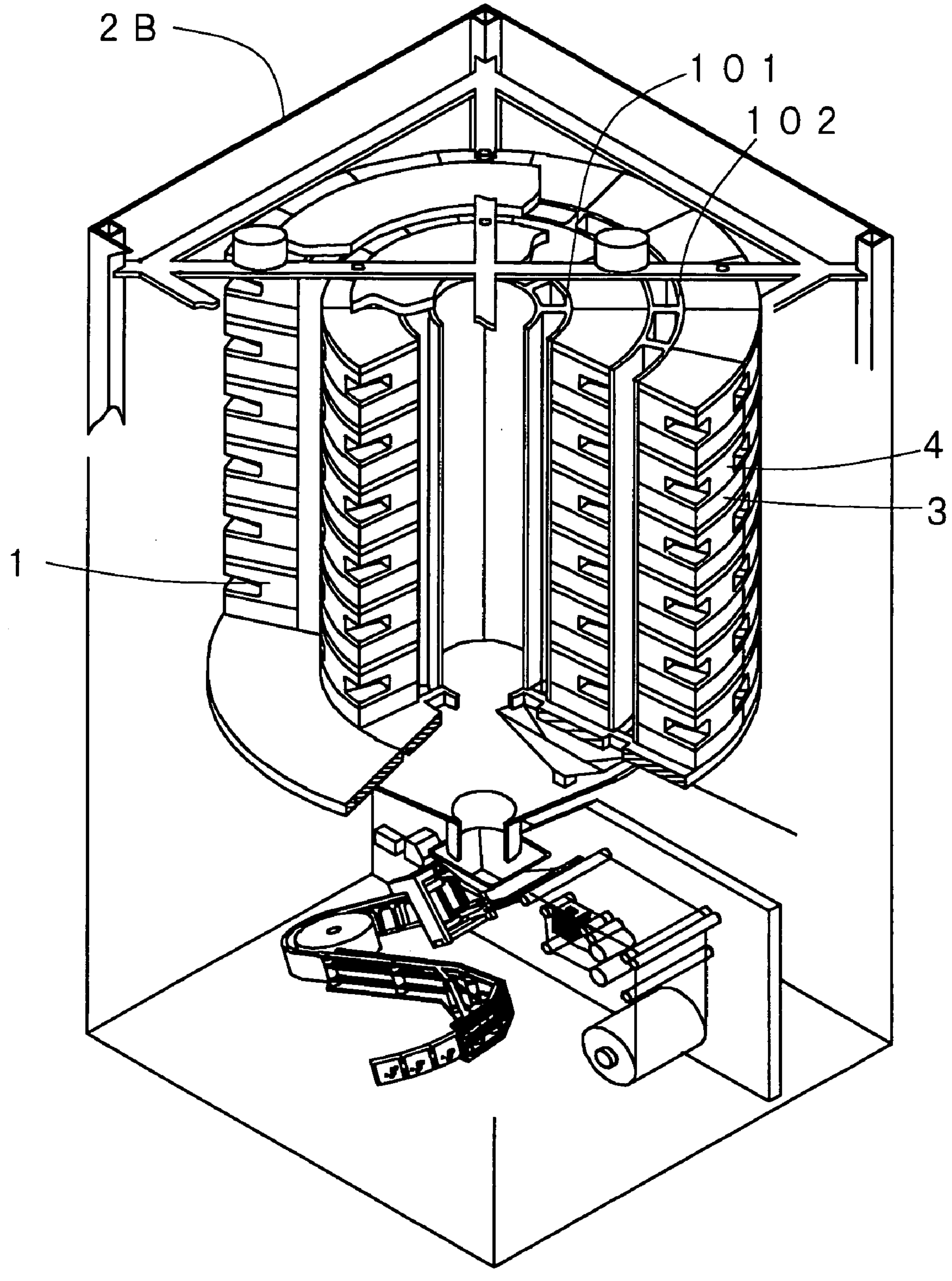
FIG. 6 is a perspective view showing another tablet feeding apparatus on which the tablet feeder shown in FIG. 1 is installed.

FIG. 1 shows a tablet feeder 1 according to the present embodiment. The tablet feeder 1 is mounted on both sides or one side of a plurality of drawer articles 100 which can be pulled out and are installed on a drawer case-type tablet feeding apparatus 2A shown in FIG. 5, or mounted on the outer side of inner and outer double drums 101, 102 which are rotatably supported on upper and lower end sections and installed on a drum-type tablet feeding apparatus 2B shown in FIG. 6.

The tablet feeder 1 is composed of case support tables 3, which are placed on the drawer articles 100 of the tablet feeding apparatus 2A or a drum 102 of the tablet feeding apparatus 2B, and tablet storage cases 4 which can be mounted on or dismounted from the case support tables 3.

Figure 2:
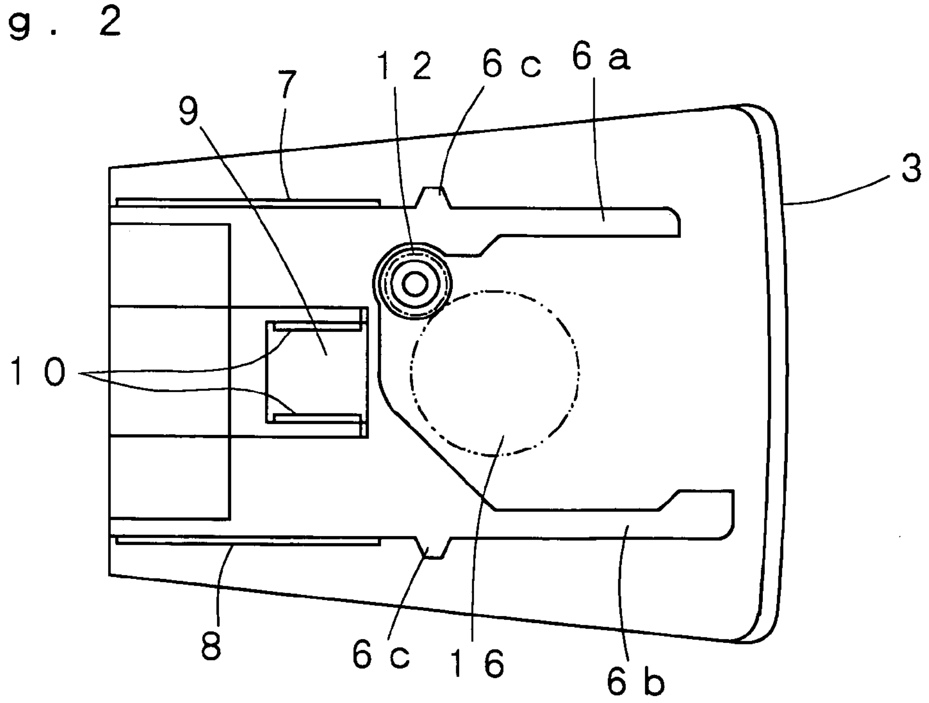
FIG. 2 is a plan view showing a case support table shown in FIG. 2.
Figure 3:
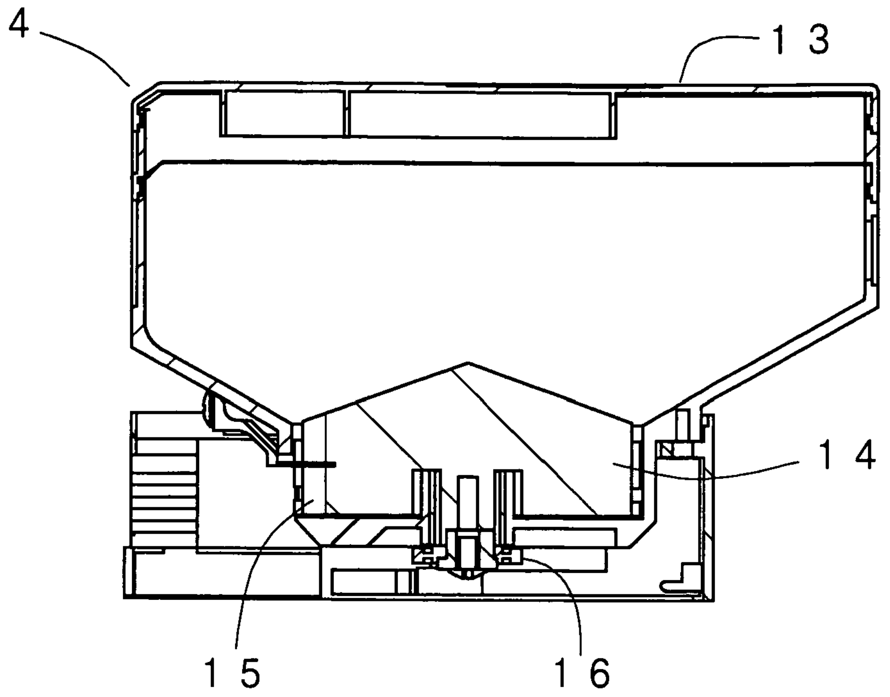
FIG. 3 is a cross sectional view showing a tablet storage case shown in FIG. 1.
Figure 4:
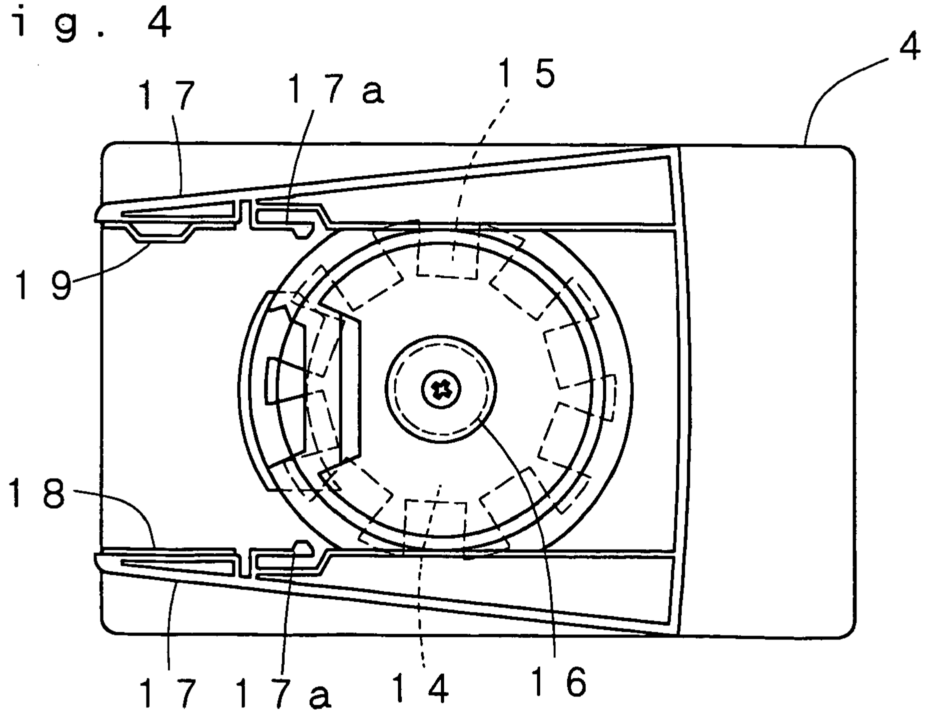
FIG. 4 is a bottom view showing the tablet storage case shown in FIG. 1.

As shown in FIG. 2, the case support table 3 has guide sections 6*a*, 6*b* disposed side by side at a specified interval on an upper surface. On the respective side surfaces of the guide sections 6*a*, 6*b*, a locking section 6*c* is provided in a protruding state. On the surface of one guide section 6*a*, an identification sensor 7 is provided. Herein, the identification sensor 7 uses a transmission sensor made up of plural pairs of a light emitting element and a light receiving element. The identification sensor 7, as described later, is used to detect a bar code 18 put on the tablet storage case 4 and automatically identify tablets housed in the tablet storage cases 4. It is to be noted that magnetic sensors such as hall ICs are also adaptable. Moreover, on the side surface of the other guide section *6b*, there is formed a semiconductor pattern 8, which makes it possible to detect mounting and dismounting states of the tablet storage case 4 on and from the case support table 3. Moreover, a delivery passage 9 is formed in the case support table 3. A counting sensor 10 is provided on the delivery passage 9, which allows counting of the passing tablets. The counting sensor 10 herein uses a transmission sensor made up of a light emitting element and a light receiving element. Further, a motor 11 which is drive-controlled in response to a control signal from an unshown control unit is housed inside the case support table 3. A rotating shaft of the motor 11 protrudes from the top surface of the case support table 3, and a protruded portion is integrated with a drive gear 12. It is to be noted that the passage of electric current through the identification sensor 7 and the counting sensor 10 are controlled so that the identification sensor 7 and the counting sensor 10 are set to on state immediately after the start of mounting of the tablet storage case 4 on the case support table 3 or after passing of certain time as described later.

The tablet storage case 4 is almost in a box shape, and its top surface can be opened and closed with a cover article 13. The upper surface of the bottom wall of the tablet storage case 4 is formed almost into a conical shape, in which a rotor 14 is disposed.

A plurality of groove-shaped pocket sections 15 extending in vertical direction are formed equiangularly on the external surface of the rotor 14. The pocket section 15 has a width and a depth that allows retention of only one tablet that is stored. A rotating shaft of the rotor 14 protrudes from the lower surface of the bottom wall of the tablet storage case 4, and is integrated with a driven gear 16.

Moreover, on the bottom surface of the tablet storage case 4, there are formed guide reception sections 17 which are guided by the guide sections 6 of the case support table 3. On the guide reception sections 17, there is respectively formed an elastic locking reception section 17*a* which is locked with and unlocked from the locking section 6*c* formed on each of the guide sections 6*a*, 6*b*. A bar code 18 (equivalent to the information display section of this embodiment) detected by the identification sensor 7 is provided on one inner side surface of the guide reception section 17. The bar code 18 corresponds to the kind of a tablet stored in the tablet storage case 4, and information about the tablet such as the kind of the tablet is displayed on an unshown display section based on a detection result of the bar code 18 by the identification sensor 7.

Further, on the other inner side surface of the guide reception section 17, a metal plate 19 is electrically connected to the conductive pattern 8. The metal plate 19 and the conductive pattern 8 constitute the case detection means of the present invention.?

The counting sensor 10 may be set to on state immediately upon contact of the metal plate 19 with the conductive pattern 8, or may be set to on state after passing of estimated time necessary for noise influence due to external perturbations such as light from a fluorescent lamp to disappear at the time of starting mounting of the tablet storage case 4 on the case support table 3. In the latter case, however, if tablets should be dropped off from the tablet storage cases 4 during a period from the start to the end of the mounting of the tablet storage cases 4 on the case support tables 3, it is necessary that the dropped tablets can be detected by the counting sensor 10.

Description is now given of the operation of the above-structured tablet feeder 1.

When the tablet storage case 4 is dismounted from the case support table 3, the metal plate 19 becomes out of contact with the conductive pattern 8, so that the identification sensor 7 and the counting sensor 10 keep on state. This ensures prevention of erroneous detection by the identification sensor 7 or the counting sensor 10 due to external perturbations such as light from a fluorescent lamp.

Figure 7:
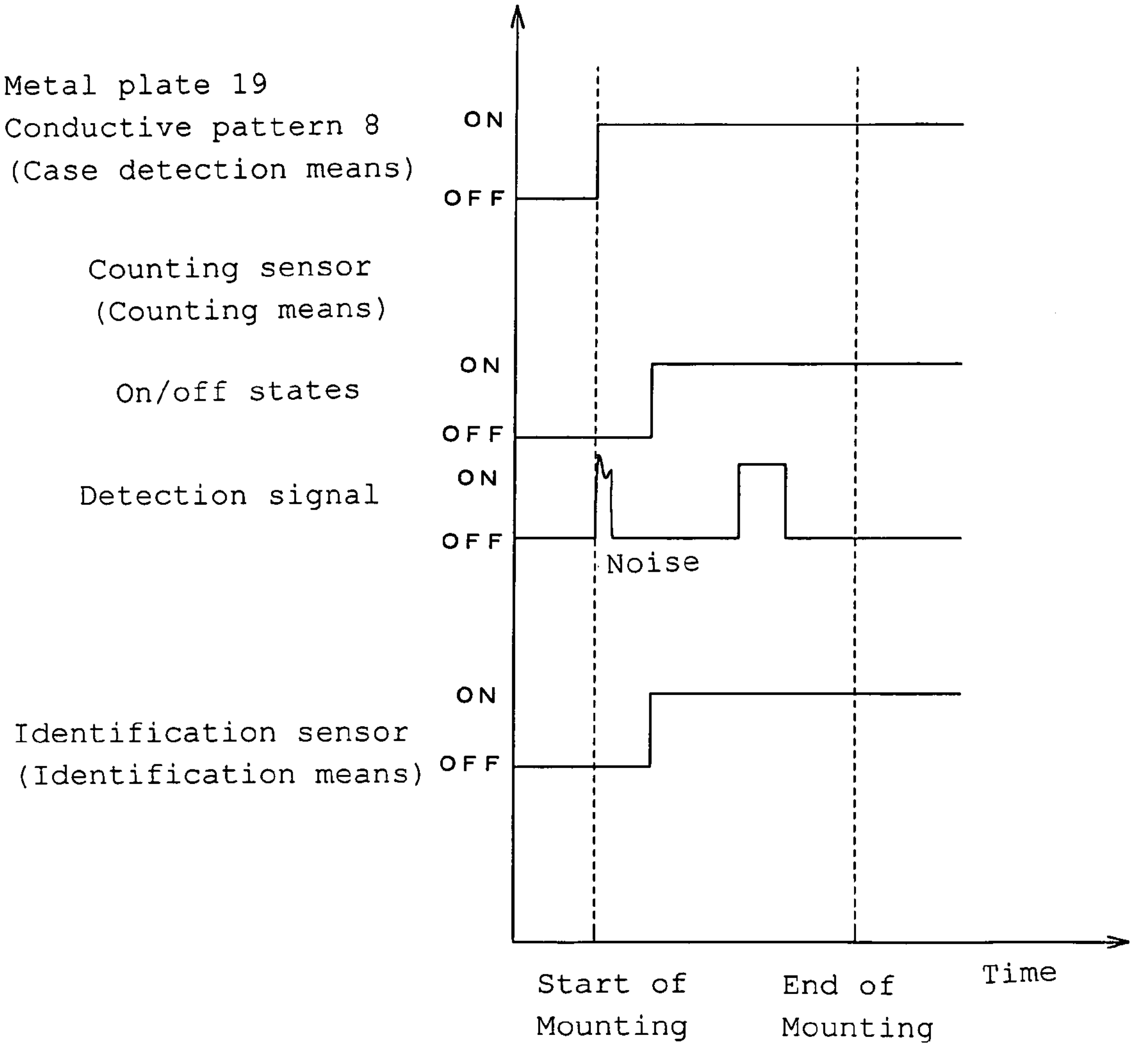
FIG. 7 is a time chart showing on/off states of a case detection means, a counting means and an identification means.

When the tablet storage case 4 is mounted on the case support table 3, as shown in FIG. 7, the conductive pattern 8 comes into contact with the metal plate 19 immediately after the start of mounting, and both the identification sensor 7 and the counting sensor 10 are set to on state. However, as described before, they may be set to on state after passing of a time during which noise is generated due to influence of external perturbations immediately after the start of mounting of the tablet storage case 4 on the case support table 3. This makes it possible to surely detect the tablets passing through the delivery passage by the counting sensor 10 even when the tablet storage case 4 is mounted on the case support table 3.

Although in the aforementioned embodiment, the case detection means is composed of a combination of the conductive pattern 8 and the metal plate 19 which is simply for obtaining electrical conduction, various means such magnetic sensors including hall elements and MR elements as well as limit switches are also applicable.

Further, in the aforementioned embodiment, the conductive pattern 8 and the metal plate 19 are set to constantly keep a conductive state immediately after the start of mounting of the tablet storage case 4. However, it is also possible to structure so that with partial disconnection of the conductive pattern 8 for example, a state from the start of the mounting of the tablet storage case 4 to the middle of the mounting and a state from the middle of the mounting to the end of the mounting may be separately detected. Consequently, even if the identification sensor 7 as disclosed in the aforementioned embodiment is adopted, it becomes possible to prevent such failure as erroneous detection by the identification sensor 7 when the tablet storage case 4 is not fully mounted on the case support table 3.

The invention claimed is:

1. A tablet feeder in which tablets are delivered from a tablet storage case mounted on a case support table, and when the tablets are passed through a delivery passage formed in the ease support table, quantity of the passed tablets is counted by a counting means, the tablet feeder comprising;

case detection means for outputting a detection signal from start of mounting of the tablet storage case before end of mounting of the table storage case, so that the counting means is kept in an OFF state until a start state of mounting of the tablet storage case is detected by the case detection means and is set to an ON state after the detection.

2. The tablet feeder as defined in claim 1, wherein the tablet storage case is provided with an information display section for displaying information about tablets to be stored, and the case support table is provided with identification means for detecting the information display section, so that the identification means is kept in and OFF state until a start state of mounting of the tablet storage case is detected by the case detection means and is set to an ON state after detection.

3. The tablet feeder as defined in claim 1, wherein the counting means is set to the ON state based on the detection signal from the case detection means after passing of noise influence time.

4. The tablet feeder as defined in claim 1, wherein the case detection means is capable of separately detecting a state from a start of mounting of the tablet storage case on the case support table to a middle of the mounting and a state from the middle of the mounting to an end of the mounting.

5. A tablet feeder comprising:

at least one tablet storage case for housing a supply of tablets, said storage case having indicia tat identifies the tablets housed in said storage case, and a metal plate; and at least one case support table having a tablet delivery passage, said case support table having an identification sensor, a tablet counting sensor provided on the delivery passage to permit counting of a tablet passing therethrough, and a conductive pattern that permits detection of mounting and dismounting states of the storage case, wherein the metal plate and the conductive pattern are located so that they come into contact immediately after the start of a mounting operation, and the counting sensor is immediately set to an ON state upon contact of the metal plate with the conductive pattern so tat any tablet that is dropped from said tablet storage case during the mounting operation can be detected by the counting sensor during mounting of the storage ease on the case support table.

6. The tablet feeder as claimed in claim 5, further comprising a pair of guide sections disposed side by side on an upper surface of said case support table, wherein the identification sensor is provided on a surface of one of the guide sections and the conductive pattern is formed on a surface of the other of the guide sections.

7. The tablet feeder as claimed in claim 6, further comprising a pair of guide reception sections disposed on a bottom surface of said tablet storage case, the guide reception sections being guided by the guide sections during mounting of said tablet storage case on said case support table;

wherein the indicia is provided on a surface of one of the guide reception sections so as to be detectable by the identification sensor, and the metal plate is provided on a surface of the other of the guide reception sections so as to contact the conductive pattern immediately upon the start of mounting of said tablet storage case on said case support table.

8. A tablet feeder comprising:

at least one tablet storage case for housing a supply of tablets, said storage case having indicia that identifies the tablets housed in said storage case, and a metal plate; and at least one case support table having a tablet delivery passage, said case support table having an identification sensor, a tablet counting sensor provided on the delivery passage to permit counting of a tablet passing therethrough, and a conductive pattern that permits detection of mounting and dismounting states of the storage case, wherein the metal plate and the conductive pattern are located so that they come into contact after the start of a mounting operation, and the counting sensor is set to an ON state upon contact of the metal plate with the conductive pattern and after the passing of a noise influence time so that any tablet that is dropped during the mounting operation can be detected by the counting sensor during mounting of said tablet storage case on said case support table.

9. The tablet feeder as claimed in claim 8, further comprising a pair of guide sections disposed side by side on an upper surface of said case support table, wherein the identification sensor is provided on a surface of one of the guide sections and the conductive pattern is formed on a surface of the other of the guide sections.

10. The tablet feeder as claimed in claim 9, further comprising a pair of guide reception sections disposed on a bottom surface of said tablet storage case, the guide reception sections being guided by the guide sections during mounting of said tablet storage case on said vase support table, wherein the indicia is provided on a surface of one of the guide reception sections so as to be detectable by the identification sensor, and the metal plate is provided on a surface of the other of the guide reception sections so as to contact the conductive pattern immediately upon the start of mounting of said tablet storage case on said case support table.

* * * * *